April 5, 1932.  H. C. HANSON  1,852,846
VALVE FOR CARBURETING AND STARTING
Filed May 3, 1929
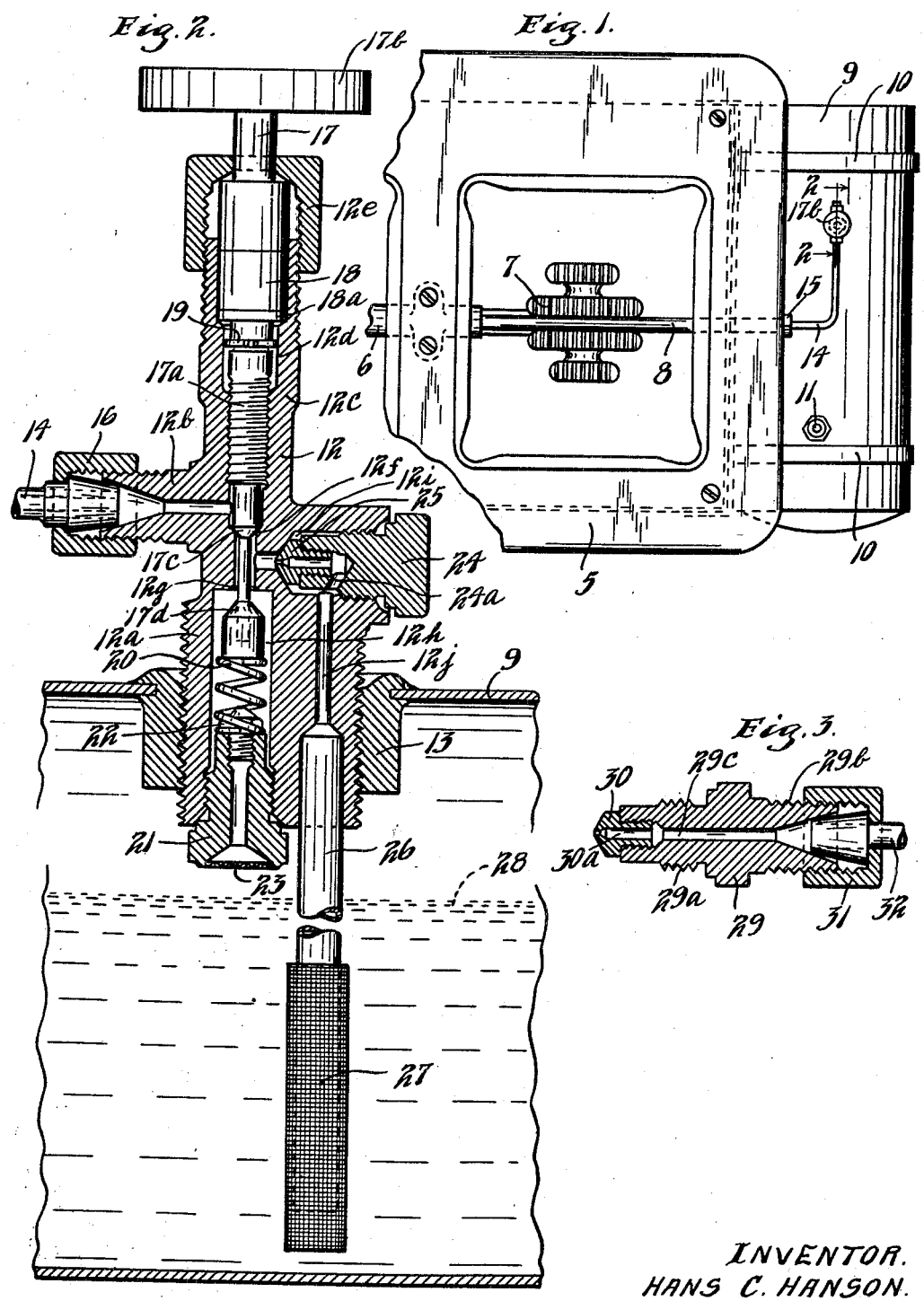
INVENTOR.
HANS C. HANSON.
BY HIS ATTORNEYS.

Patented Apr. 5, 1932

1,852,846

UNITED STATES PATENT OFFICE

HANS C. HANSON, OF ALBERT LEA, MINNESOTA

VALVE FOR CARBURETING AND STARTING

Application filed May 3, 1929. Serial No. 360,253.

This invention relates to a stove, lamp or other article having a burner using liquid vaporizing fuel. Such stoves and lamps are now used in large numbers and burn a vaporizing fuel, usually gasoline. Until quite recently it has been necessary to start the burners of such lamps and stoves by preliminary heating the same with a torch or priming cup. More recently an auxiliary burner has been supplied which may be at once ignited with a match to preliminarily heat the vaporizing member so that the stove or lamp can then be lighted.

It is an object of this invention to provide a structure whereby the burner can be lighted at once without any heating from a separate means, such as a torch or priming cup or without any preliminary heating from an auxiliary burner.

It is a further object of the invention to provide a structure whereby a combustible mixture from the fuel tank used is initially supplied to the burner, after which only fuel is supplied, the fuel being vaporized and mixed with air adjacent the burner, said burner acting to heat a vaporizing member.

It is still another object to provide a lamp or stove having a burner and a fuel tank in which the fuel is contained under air pressure, a conduit connecting the tank and burner, together with means for placing said conduit into communication with both the air space in said tank and the fuel in said tank and subsequently shutting off communication with the air space.

It is still another object of the invention to provide a lamp or stove having a tank in which the liquid vaporizing fuel is disposed under air pressure, a burner and a conduit leading to the burner and a valve having a passage therein in communication with the air space of said tank and also in communication with the fuel in said tank, said passage being placed in communication with said conduit when the valve is opened to a certain extent and communication with the air space in said tank being shut off when the valve is opened to a greater extent.

It is more specifically an object of the invention to provide a lamp or stove, comprising a burner, a conduit leading thereto, a fuel tank containing liquid vaporizing fuel under air pressure, a valve to which said conduit is connected, said valve having a passage with valve seats at either end thereof, a stem in said valve with an operating handle thereon and carrying valves cooperating respectively with said seats, said handle being turnable a certain distance to move one of said valves from its seat to place said passage into communication with the air space in said tank and with the fuel in said tank, said handle being further turnable to move the other valve to its seat and cut off communication of said passage with the air chamber in said tank.

These and other objects and advantages of the invention will be fully set forth in the following description made in connection with the accompanying drawings, in which like reference characters refer to similar parts throughout the several views, and in which:—

Fig. 1 is a plan view of a portion of one form of stove with the invention applied thereto;

Fig. 2 is a view taken on line 2—2 of Fig. 1 as indicated by the arrows, and

Fig. 3 is a small sectional detail showing a modification.

Referring to the drawings, a stove is shown comprising a frame including a top plate 5 to which is secured a manifold member 6 carrying at one end a burner 7. A vaporizing tube 8 is provided for conducting fuel to the manifold 6 which manifold in most cases includes a mixing chamber. Vaporizing tube 8 extends over burner 7 so as to be heated by the flame thereof. A fuel tank 9 is provided secured to the frame by straps 10, said tank being shown as having a filling plug 11 therein which will be constructed and arranged to be connected to an air pump for forcing air into said tank.

In accordance with the present invention, a valve member 12 is provided. While this valve member may be placed in any convenient location on the lamp or stove, in the embodiment of the invention illustrated it is shown as having a lower portion 12a externally threaded to be screwed into a hub or block 13 tightly fitted into the top of the tank 9. A conduit 14 is connected to tube 8 by a suitable coupling 15 said conduit being connected at its other end by a suitable coupling 16 to a laterally projecting discharge nipple 12b of valve 12. Valve 12 has an upwardly extending portion 12c having a passage 12d extending therethrough, one portion of which is threaded to receive the threaded portion 17a of a valve stem 17 having an operating wheel 17b at its upper end. Passage 12d is enlarged at its upper end to receive packing 18 through which stem 17 passes, said packing having a washer 18a at its bottom seated in passage 12d and being compressed by a cap member 12e threaded onto the outer side of portion 12c at its upper end whereby said packing is pressed against the wall of passage 12d and the stem 17. Some distance above its threaded portion stem 17 is provided with an annular groove in which is seated a split washer 19 slidable with the stem in passage 12d and adapted to engage washer 18a when the stem 17 is moved sufficiently upwardly. Below its interiorly threaded portion passage 12d has formed therein a valve seat 12f with which a valve-forming beveled portion 17c of the stem coperates. Passage 12d extends in reduced form below seat 12f, stem 17 extending therethrough, it being of considerably less diameter than said passage, said passage having another valve seat 12g in its bottom with which a valve-forming beveled portion 17d of the stem 17 cooperates. Stem 17 has an enlarged head at its lower end which has formed thereon the valve portion 17d, the stem being pressed upwardly by coiled compression spring 20 disposed in a chamber 12h into which passage 12d opens, said spring engaging the bottom of stem 17 at its upper end and engaging a plug 21 at its lower end, which plug is threaded into the bottom of portion 12a of the valve 12. A headed screw 22 is threaded into the top of plug 21 and surrounded by the lower end of spring 20 and acting to hold said spring in position, screw 22 having an aperture extending therethrough communicating with a central aperture extending through plug 21. Plug 21 has a screen 23 fitted into its lower end, which lower end is disposed in the air space of tank 9. Valve 12 has a laterally extending portion provided with a passage 12i from the inner end of which a small passage extends into passage 12d between the valve seats 12f and 12g. Passage 12i is interiorly threaded at its outer end to receive a plug 24 which is bored and tapped at its inner end to have screwed therein a small headed plug 25 having a central aperture extending therethrough, of quite small diameter at its inner end axially aligned with passage 12i. Plug 24 is reduced in diameter at its inner end, thus providing an annular space thereabout in passage 12i, and the same has a hole or passage 24a formed therein affording a communication between this annular space and the bore of said plug in the rear of plug 25. Valve 12 is provided with a downwardly extending bore or passage 12j communicating at its upper end with the annular space about plug 24 which passage 12j is enlarged at its lower end and has secured therein the upper end of a tube 26 which extends downwardly therefrom to adjacent the bottom of tank 9. A screen 27, shown as cylindrical in form and having a closed lower end surrounds the lower portion of tube 26.

The operation of the described structure is as follows:

The tank 9 will contain a certain amount of fuel, indicated as 28 in Fig. 2 and air will be pumped into said tank to place said fuel under air pressure. When the stove is not being used, valve portion 17c will engage seat 12f and communication with tube 14 will be shut off. Some of the fuel will vaporize and there will be some of the said vapor in the upper end of tube 26 and passage 12j. When the stove is to be started, the operator will turn wheel 17b a short distance to lift valve portion 17c from its seat 12f and bring passage 12d between seats 12f and 12g into communication with the conduit 14. Communication will therefore be made down through chamber 12h and through plugs 21 and 22 to the air space in tank 9. Communication will also simultaneously exist through tube 26, passages 12j, 24a and through plugs 24 and 25 with the fuel in tank 9. The air being under pressure, it will pass out through the valve and into conduit 14 carrying with it sufficient vaporized fuel through tube 26 to form a combustible mixture. This mixture will pass to the vaporizing tube 8 and to burner 7 and can be instantly lighted at the burner by an ordinary match. The burner 7 will be placed in operation and the flame therefrom will immediately begin to heat vaporizing tube 8. Tube 8 will therefore be quickly heated sufficiently to vaporize any fuel passing therethrough and after burner 7 has been in operation a very short time the operator will turn wheel 17b to a greater degree thus moving stem 17 upwardly and bringing valve 17d against the seat 12g. Communication will now be shut off with the air space in tank 9 and fuel will continue to pass through the valve to conduit 14 from tube 26 due to the air pressure on the fuel in tank 9. The stove will now be fed with fuel in the usual way, which fuel will be vaporized as it passes through tube 8, which tube is now heated and the vaporized fuel will be mixed with air in the mixing chamber and the combustible mixture supplied to burner 7. Burner 7 will of course continue to keep vaporizing tube 8 heated. The washer 19 will prevent stem 17 being elevated to too great a degree should the member carrying valve seat 17d on stem 17 become loosened or removed.

The valve 12 may not be located on the tank 9 and if it should be mounted at some other part of the stove, plugs 21 and 24 will be respectively replaced with a plug such as shown at 29 in Fig. 3. This plug is threaded at 29a to be screwed into portion 12a of valve 12 and into the passage 12i. The same has a smaller plug 30 threaded into its end which will function as do the plugs 25 and 22. The outer end of plug 29 is threaded at 29b to receive a coupling member 31 for coupling a small tube 32 to the plug, said tube having a frusto conical end, the smaller end of which is pressed against the wall of the flaring portion at the outer end of bore 29c which extends through plug 29. The tube 32 on plug 29 which will be mounted in portion 12a will extend to the air space in the fuel tank and a similar tube extending from plug 29 which is screwed into passage 12i will extend into the fuel of the tank 9 and to adjacent the bottom of the tank. Plug 30 of course has a central bore 30a reduced at its outer end.

From the above description it is seen that applicant has provided a very simple and efficient structure, by means of which the burner of a lamp or stove can be lighted at once without initially heating the vaporizing tube by a separate heating torch, priming cup or by means of an auxiliary starting burner. But one valve is used and additional valves for controlling an auxiliary burner or other parts are thus eliminated. The burner of the stove is instantly lighted and once lighted, continues in operation, it only being necessary to turn the valve handle in two operations. With the structure a serious objection to a stove or lamp using liquid vaporizing fuel is eliminated. The device has been amply demonstrated in actual practice and found to be very successful and efficient.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. A lamp or stove using liquid vaporizing fuel, comprising a burner, a fuel tank adapted to contain liquid vaporizing fuel under air pressure, a valve member applied to said tank and having a passage running therethrough and communicating at its lower end with the air space in said tank, opposed valve seats formed in said passage, one of which is more remote from said tank than the other, a conduit communicating with said passage between said valve seats and running into the fuel space of said tank and communicating therewith, a conduit communicating with said passage beyond said valve seat remote from said tank and running to said burner, a valve stem within said passage and having a reduced portion of less diameter than said passage between said valve seats, valves carried by said stem for engagement with said respective valve seats and joining the ends of said reduced portion and means for moving said stem longitudinally of said passage.

2. The structure defined in claim 1, said stem having a screw threaded portion screw threadedly engaged with said passage for moving said stem longitudinally of the passage and a spring urging said stem in one direction.

3. A lamp or stove using liquid vaporizing fuel having in combination, a burner, a fuel tank adapted to contain liquid vaporizing fuel under air pressure, a valve body mounted in said tank and having a passage running therethrough, the lower end of which is in communication with the air space in said tank, upper and lower valve seats oppositely disposed and formed in said valve body, a conduit communicating with said passage between said valve seats and running downwardly into the liquid fuel space of said tank, a conduit communicating with said passage above said upper valve seat, a stem disposed within said passage and having a reduced portion longer than the space between said valve seats and located therein, valves carried by said stem and joining the ends of said reduced portion for cooperation respectively with said valve seats and means for moving said stem longitudinally of said passage.

In testimony whereof I affix my signature.

HANS C. HANSON.